Fig. 3
Fig. 4
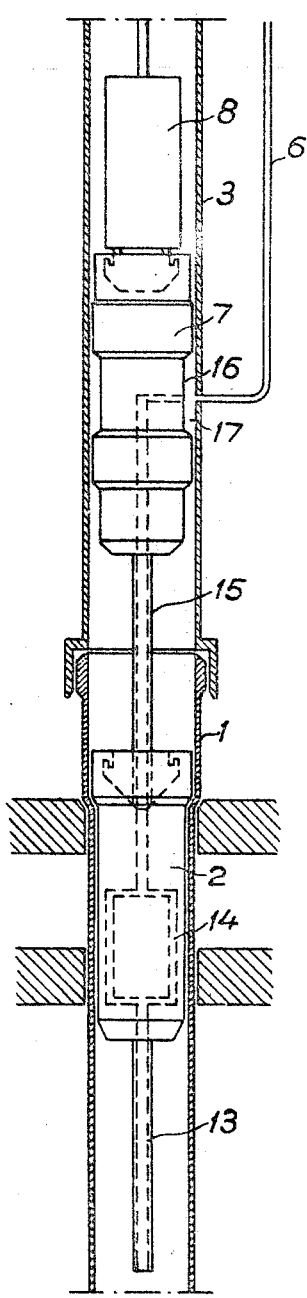
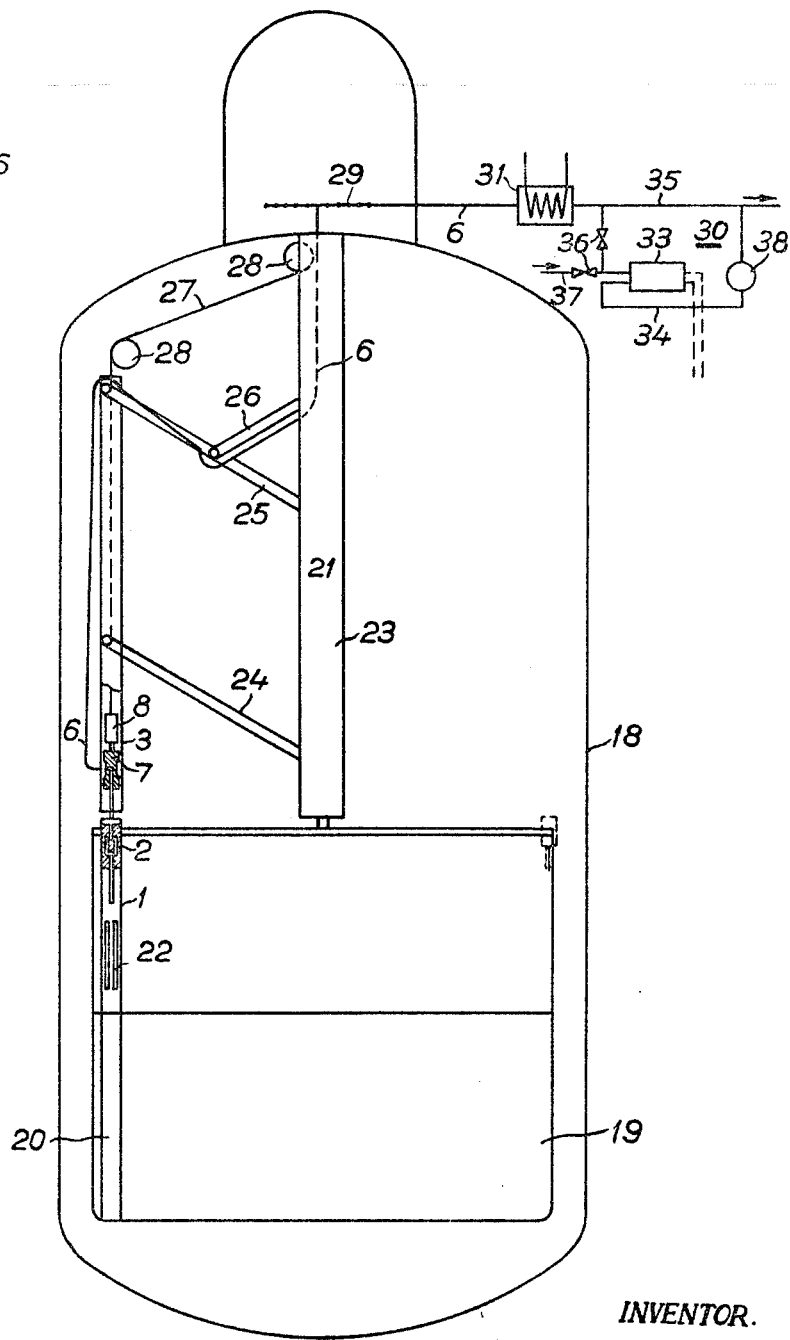

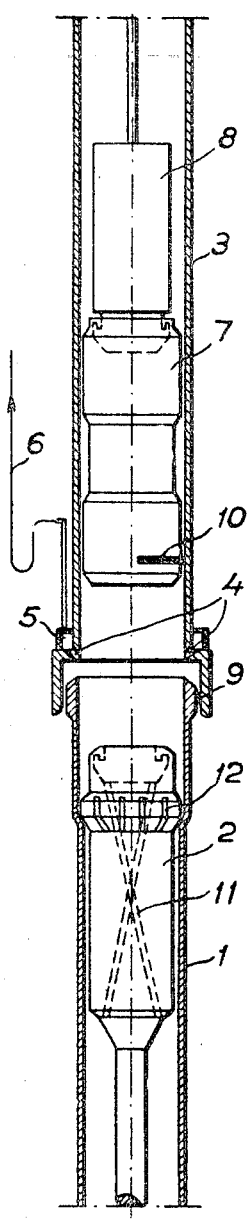
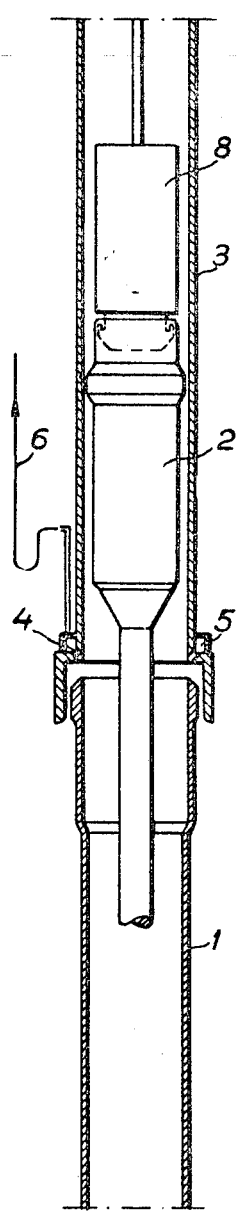

United States Patent Office 3,575,802
Patented Apr. 20, 1971

3,575,802
NUCLEAR REACTOR HAVING A RUPTURE DETECTING SYSTEM
Hendrik Gelius, Vasteras, Sweden, assignor to Allmanna Svenska Elektriska Aktiebolaget, Vasteras, Sweden
Continuation-in-part of application Ser. No. 499,405, Oct. 21, 1965. This application Mar. 13, 1968, Ser. No. 712,692
Claims priority, application Sweden, Dec. 16, 1964, 15,195/64
Int. Cl. G21c 17/04
U.S. Cl. 176—19                            6 Claims

ABSTRACT OF THE DISCLOSURE

A device for detecting faults in a nuclear reactor by analyzing samples of the reactor cooling medium has a movable sampling member situated inside the reactor vessel and connectible to the fuel elements one by one and a sampling conduit connected between the sampling member and a monitoring system situated outside the reactor vessel.

PRIOR APPLICATIONS

This application is a continuation-in-part of my application Ser. No. 499,405, now abandoned, filed Oct. 21, 1965.

BACKGROUND OF THE INVENTION (1) Field of the invention

The present invention relates to a detecting system for revealing defects in the fuel assemblies in a nuclear reactor.

(2) The prior art

Such detecting systems are used generally for revealing ruptures or similar faults in the cladding which surrounds the fuel itself in the fuel assemblies. Upon a fault in the cladding the radio-activity in the coolant flowing along the fuel assemblies increases and the increased radio-activity influences a main monitoring system which measures the radio-activity in the working medium flowing out from the reactor. If the main monitoring system gives an alarm signal on account of high radio-activity, it is however not known in which part of the reactor core the fault has occurred. It is therefore necessary to arrange a sampling system by means of which coolant samples can be taken out from each individual fuel assembly or at least from certain groups each comprising only a few fuel assemblies. Conventional detecting systems comprise a large number of separate sampling conduits, usually one for each fuel assembly. These conduits are arranged to pass through the wall of the reactor vessel, through a surrounding pressure-tight shell and through the radiation shield of the reactor to a monitoring system placed outside the reactor for measuring the radio-activity in the separate sampling conduits. The system causes a very large number of through-going tubes with valves and sealing material to be arranged at such lead-throughs. Through-going tubes weaken the reactor vessel to a high degree and the severe safety requirements and demands for absolute tightness means that the cost for the hundreds of lead-throughs of a conventional detecting system is particularly high.

SUMMARY OF THE INVENTION

The object of the present invention is to provide a detecting system with considerably more simple form than the earlier known systems and with only one tube conduit between the inner and outer side of the reactor. The invention is characterized in that the reactor is provided with a handling device arranged in it, connectable to the fuel assemblies with a sample intake for collecting coolant flowing along the fuel assemblies and that this intake is connected to a monitoring system arranged outside the reactor for measuring the radio-activity of said coolant flow. The handling device preferably consists of the normal fuel handling machine of the reactor. By using this already existing device in the detecting system the cost of the detecting system is reduced considerably. In reactors which lack an inner fuel handling machine, according to the invention a corresponding but more simple handling machine must be arranged in order that the sample intake of the detecting system can be connected to the different fuel assemblies. Also in such cases however the cost of the detecting system will be considerably less than for conventional systems with a much greater number of through-going tubes.

Still another considerable advantage is achieved with a detecting system according to the invention. During normal replacement of fuel assemblies in the reactor core, these assemblies are subjected to increased stress on account of rapid temperature changes and mechanical loading. The risk of cladding damage is thus specially great during the handling operation itself. The invention ensures that faults which occur during the handling are immediately registered by the monitoring system when the damaged fuel assembly during the raising or lowering which takes place during the handling passes the sample intake in the handling machine. A number of additional sample intakes could be arranged farther up in the handling machine.

In a nuclear reactor the fuel handling machine is often provided with a guide tube, connectable to coolant conducting tubes surrounding the fuel assemblies in the reactor core. According to the invention, the sample intake is preferably arranged close to the connection end of the guide tube. When they are joined together, the tubes form a duct for the coolant, of which a part is taken out as a sample. The sample is significant for that fuel assembly to which the handling machine is connected because the said tubes to a considerable extent prevent the mixing in of coolant from other fuel assemblies. In order further to lessen the possibility of such a mixing in, the guide tube of the handling machine above the connection to the coolant conducting tube of the fuel assembly is provided with a member which at least substantially seals off the tube. Since the coolant conducting tubes of the fuel assemblies are usually closed at the top by a radiation protecting plug, it must be possible for the coolant to pass the plug. This is brought about according to the invention preferably by arranging through-flow ducts in the plug, which ducts at least to some extent are crooked or directed obliquely in relation to the longitudinal axis of the tube. The handling machine can also be made to lift out said plug during sampling which then does not need to be provided with through-flow ducts. In this case, the lifted plug can be arranged to seal the guide tube of the handling machine in an upward direction. The sampling at the different fuel assemblies requires a somewhat longer time if the radiation protection plugs above the fuel assemblies for each sample are raised. The sampling is carried out faster with the previously described system, where a special member member which is supported by the grab device of the handling machine seals the guide tube of the machine in an upward direction. Sampling can thus be carried out as soon as the guide tube of the handling machine has been connected to the coolant conducting tube of a fuel assembly.

The sampling can also be carried out by means of a suitable sampling probe device which is grabbed by the handling machine and is inserted into the coolant conducting tubes of the fuel assemblies. The probe device is connected by means of a flexible tube conduit to the monitoring system outside the reactor.

BRIEF DESCRIPTION OF THE DRAWINGS

In the following the invention will be described more fully with reference to the accompanying figures which show schematically the connection of the sampling equipment to the conducting tubes of the fuel assemblies in two different embodiments of the invention. FIG. 1 shows an axial section of an embodiment which operates without lifting up the radiation protection plug of the fuel assembly and FIG. 2 shows an embodiment in which said radiation protection plug is lifted up during sampling. FIG. 3 shows an embodiment having a different form of plug. FIG. 4 shows a reactor having a complete faulty fuel system.

DESCRIPTION OF THE PREFERRED EMBODIMENTS

Figure 5:
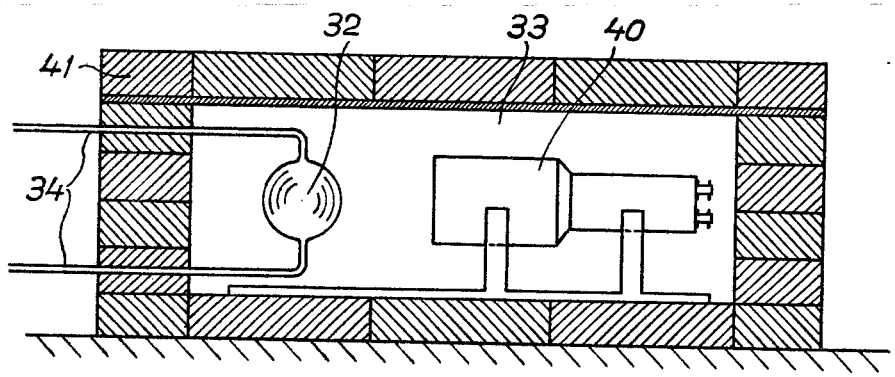
FIG. 5 shows the external detector and FIG. 6 the electrical network connected to the detector.

In the drawings, 1 denotes a coolant conducting tube which surrounds a fuel assembly not shown which is placed further down in the conducting tube. The coolant conducting tube 1 is provided at the top with a radiation protecting plug 2. A handling machine, preferably the normal fuel handling machine of the reactor, comprises a guide tube 3 which is connected to the coolant conducting tube 1 of the fuel assembly. Close to the connection point there are outlets 4, through which a part of the coolant flowing along the fuel assembly can be led out as a sample. The outlets 4 lead to a collection chamber 5 which in its turn, through a flexible tube conduit 6 which is carried by the handling machine, in a suitable way is connected to a monitoring system outside the reactor. The guide tube 3 of the handling machine is sealed upwards by a plug 7 which is supported by the grab device 8 of the handling machine. The connection between the two tubes 1 and 3 need not be absolutely tight and neither need the plug 7 completely seal the guide tube 3 of the handling machine, since mixing of a coolant other than that which flows out along the tested fuel assembly normally only occurs to a small degree because there is an overpressure in the coolant conducting tube 1. On the right-hand side of FIG. 1 it is shown that if desirable, seals 9 and 10 can easily be arranged at the tube connection and at the upper sealing plug. The use of seals means that reliable measuring results can be obtained even when the reactor operates with very low power when also the inner overpressure in the conducting tube 1 is low.

In order that the coolant flowing along the fuel assembly may be able to pass the radiation protection plug 2 of the fuel assembly, this plug is provided with through-flow ducts 11 and 12. The ducts 11 consist of oblique through-going bores and the ducts 12 of cut-outs at the periphery of the plug.

Usually the rapidly acting device according to FIG. 1 of the present application is used to detect leaks. When a leak is suspected, the fuel handling machine puts the plug 7 in its rest position, for instance at the outer rim of the core as shown. Then the fuel handling machine can return to the suspected fuel assembly or assemblies and test them after lifting plugs 2.

With such an arrangement (FIG. 2) it is possible to test the fuel assemblies even during the exchange operation when latent cladding defects due to strain are likely to cause real defects.

In FIG. 2 sampling with an equipment which differs from that shown in FIG. 1 is shown, in that the radiation protection plug 2 of the fuel assembly during each sampling is lifted by the grab device 8 of the handling machine so that at least to some extent it seals the guide tube 3 of the handling machine in upward direction. The radiation protection plug 2 does not need to be provided with through-flow ducts, since it is lifted during sampling. For the rest, the embodiment shown in FIG. 2 agrees with that shown in FIG. 1.

In FIG. 3 a sample is taken in through tube 13 into the radiation shielding plug 2, where it is divided into a number of parallel streams in ducts 14 and then brought together again. The reunited sample passes from the plug 2 into the abutting tube 15 of the sealing plug 7, further up the plug 7 and out through its waist 16 into the annular space 17 from where it is passed into conduit 6.

The reactor shown in FIG. 4 is a BWR of the type shown in French Pat. 1,314,879, and comprises a reactor vessel 18, a core 19 comprising a plurality of parallel fuel assemblies 20 (only one assembly is shown) and an internal fuel-handling machine 21. Water heated and partially vaporized when passing the fuel assemblies 20 rises in the coolant conducting tubes 1 and leaves through outlet ports 22.

The internal fuel-handling machine 22 comprises a central member 23, a guide tube 3, parallel link parts 24 and 25 of equal length connecting the central member 23 and the guide tube 3, a further link part 26 half as long as the other link parts and connected between one of these first link parts and the central member so as to permit a parallel movement of the guide tube 3 in radial direction, a hoist cable 27 running over pulleys 28 and provided with a grab device 8, and suitable hoist means, positioning means, position indicating means and so on (not shown) to fulfill the requirements of a fuel exchange operation.

The sample conduit 6 passes along the guide tube 3, the link parts 25 and 26 and the central member 23 to a helix 29 and out through the wall of the reactor vessel 18 to an external monitoring system 30. The helix 29 absorbs twisting forces resulting from the rotating movement of the fuel-handling machine 21. Instead of a helix a swivel joint may be used.

Figure 6:
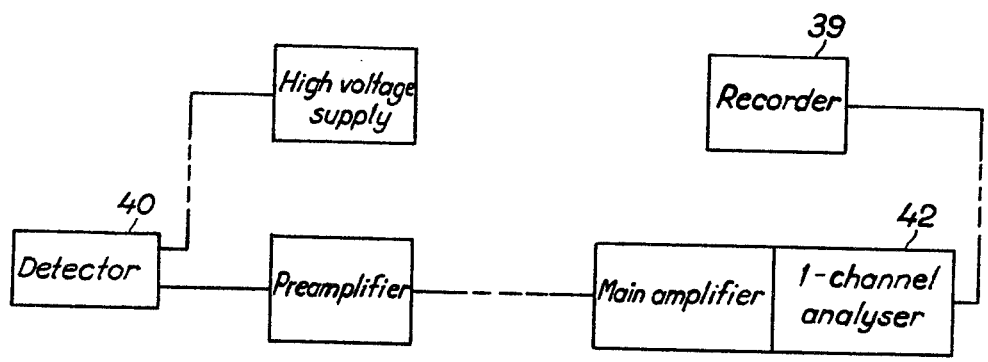

The external monitoring system is shown in FIGS. 4 to 6.

Steam sampled from the different fuel assemblies 20 is condensed in a special condenser 31 and the condensate is analyzed to determine the concentration of fission products. The analysis is made either radio-chemically, by manual sampling in an analysis laboratory or with the aid of a continuously working fission product monitoring system 30.

To make this monitoring system simple the sampling should be continuous, that is when the fuel-handling machine 21 is not connected to any of the cooling medium conducting tubes 1 steam samples are taken from the steam dome. The sampling should last about 4 minutes for the coolant-conducting tubes 1. It is important that the sampling time is constant, since a variation will make it hard to interpret the test results. On the other hand the time between two samplings can be chosen arbitrarily.

The time required to move the fuel-handling machine 21 between two sampling positions may be 6 to 12 minutes and a sample flow rate of about 15 grams of steam per second is suitable, as is a transport time of about 5 minutes from the sampling point to the test receptacle 32 of the fission product monitor 33. The test receptacle 32 is arranged in a shunt pipe 34 in the main pipe 35 from the condenser 31 and is provided with stop valves 36 and connections 37 for rinsing. The flow of water is measured by a flow meter 38 arranged after the test receptacle 32 and is registered by a recorder 39.

The activity of fission products is monitored preferably by a scintillation detector 40 sensitive to gamma radiation. Since a plurality of the isotopes which contribute to the background have a relatively low gamma energy compared to certain fission products, energy discrimination should be used. The discriminator level may be 2 mev. (million electron volts).

The detector arrangement is shown in FIG. 5. The rest receptacle 32 is a spherical vessel having a volume of 250 cm.$^3$. The radiation shield surrounding the test receptacle 32 and the detector 40 is advantageously made from lead bricks 41. The scintillation detector 40 is placed 10 cm. from the center of the test receptacle 32 and has an NaI crystal and a photo multiplier.

The block diagram for the scintillation detector 40 and the electronic equipment belonging to it is shown in FIG. 6. The pulse measurements are made by a one-channel analyzer 42 (maximum counting rate about $10^5$ c.p.s.). Usually only pulses over a certain level are registered, said level corresponding to a gamma energy of 2 mev. When calibrating the detector equipment, and in order to simplify the identification of certain isotopes, a one-channel analyzer is preferable to a rate meter having a simple pulse height discriminator.

The recorder 39 shown in the block diagram is preferably situated near the point from which the fuel-handling machine 21 is operated. It is then possible to determine at once in which position the faulty fuel assembly is. Information of the sampling flow in the different coolant conducting tubes 1 is also desirable when interpreting the activity measurements. Therefore also the sampling flow should be registered on said recorder 39 (preferably a 2-channel line recorder).

In table I counting rates are shown for a cladding fault with a leak factor of $5 \cdot 10^{-8}$ sec$^{-1}$ of a fuel assembly at average load at full reactor power, presuming a leakage from the steam dome into the sampling system of 2 grams steam per second.

TABLE I

| Steam sample from: | Counting rate (c.p.s.) |
| --- | --- |
| Faulty assembly | $1.76 \cdot 10^3$ |
| Non-faulty assembly | 24.1 |
| Steam dome | 6.5 |

As is evident from Table I the described equipment is well suited for detecting small cladding faults. However, on special occasions a certain adaptation of the detector-arrangement may be desired. If there is a high background activity from $A^{41}$, for instance when increasing the power of the reactor, the signal/noise ratio can be increased by inserting a lead shield between the test receptacle 32 and the detector 40.

The invention is not limited to the embodiments shown, but several variations and modifications are feasible within the scope of the following claims.

I claim:
1. In a nuclear reactor having a reactor vessel and a plurality of fuel assemblies within said vessel, each of said fuel assemblies being contained in a stationary tube conducting cooling medium, a device for detecting a faulty fuel assembly in said reactor, said device functioning during reactor operation and comprising a monitoring system outside said vessel, a single sampling conduit having one end connected to said monitoring system and passing into said reactor vessel, a positioning machine within said vessel, said positioning machine carrying, at least temporarily, a movable member connected to the other end of said sampling conduit, said machine comprising means to move said member between positions in which said member is engageable with each of said stationary tubes, said movable member constituting an at least laterally movable tube member permanently attached to said positioning machine, said movable tube member having a fuel rod handling means therein, whereby said handling machine constitutes the fuel handling machine of the reactor, a radiation protecting plug located in the top end of each of said stationary conducting tubes, and means engageable with said plug for lifting it out of the conducting tube, said lifting means being mounted within said movable guide tube and said plug substantially sealing the movable guide tube when lifted thereinto.

2. In a nuclear reactor as claimed in claim 1, a radiation protecting plug located in the top end of each of said stationary conducting tubes, said plug having passages therethrough oblique to the longitudinal axis of the conducting tube for the passage of coolant therethrough.

3. In a nuclear reactor as claimed in claim 1, a radiation protecting plug located in the top end of each of said stationary conducting tubes, said plug having passages therethrough, said passage being crooked to permit the passage of the coolant and prevent the passage of radiation therethrough.

4. A method for detecting a faulty fuel assembly in an operating nuclear reactor having a plurality of fuel assemblies, each assembly being contained in a stationary tube conducting cooling medium, said method comprising the steps during normal reactor operation of moving a single sampling conduit by means of a reactor fuel handling machine carrying, at least temporarily, a movable member connected to one end of said sampling conduit to a first position, in which said member is engageable with a first of said stationary tubes, engaging said member with said first stationary tube, extracting a sample of said cooling medium in said first stationary tube, transferring said sample through said single sampling conduit to a reactor external monitoring system connected to the other end of said sampling conduit, analyzing said sample to determine the concentration of fission products therein, thereby determining whether the fuel assembly contained in said first stationary tube is faulty or not, disengaging said member from said first stationary tube, and repeating, still during normal reactor operation, the above steps on a second, third, fourth, and so on of said stationary tubes until said faulty fuel assembly is found.

5. A method of detecting faulty fuel assemblies during a fuel assembly handling operation in a nuclear reactor having a reactor vessel, a number of fuel assemblies within the vessel, each of said fuel assemblies being contained in a stationary tube conducting cooling medium, an internal fuel handling machine provided with a movable guide tube having a fuel assembly handling means therein, said fuel handling machine comprising means to move the guide tube between positions in which said guide tube has one end connectible to each of said stationary tubes, an external monitoring system and a sampling conduit connected to said monitoring system, said sampling conduit opening into said movable guide tube, said method comprising connecting said movable guide tube to one of said stationary tubes containing the fuel assembly to be replaced, connecting said fuel assembly handling means to said fuel assembly, lifting said fuel assembly completely into said guide tube, extracting a sample of cooling medium from the cooling medium surrounding said lifted fuel assembly, transferring said sample through said sampling conduit to said external monitoring system and determining the amount of radioactive radiation emanating from said sample, thereby determining whether said lifted fuel assembly is faulty or not.

6. A method according to claim 5, said radiation being gamma radiation.

References Cited
UNITED STATES PATENTS

| | | | |
| --- | --- | --- | --- |
| 2,823,179 | 2/1958 | Snell et al. | 176—19L.D. |
| 2,855,114 | 10/1958 | Ohlinger | 176—32 |
| 2,979,451 | 4/1961 | Pettinger | 176—19L.D. |
| 3,321,370 | 5/1967 | Oppenheimer | 176—19 |

OTHER REFERENCES

Nucleonics: vol. 19, No. 7, July 1961, pp. 84, 86, 89, by Osborne.

U.S. Cl. X.R.

176—30, 87